United States Patent
Hashimoto et al.

(10) Patent No.: US 9,874,987 B2
(45) Date of Patent: Jan. 23, 2018

(54) DOUBLE-SIDED TRANSPARENT CONDUCTIVE FILM AND TOUCH PANEL

(71) Applicant: NITTO DENKO CORPORATION, Ibaraki-shi, Osaka (JP)

(72) Inventors: Naoki Hashimoto, Ibaraki (JP); Katsunori Takada, Ibaraki (JP); Kazuhiro Ikai, Ibaraki (JP); Shinya Hiraoka, Ibaraki (JP); Hiroki Kuramoto, Ibaraki (JP); Naoki Tsuno, Ibaraki (JP); Toru Umemoto, Ibaraki (JP); Hiroyuki Takao, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/114,288

(22) PCT Filed: Jan. 29, 2015

(86) PCT No.: PCT/JP2015/052510
§ 371 (c)(1),
(2) Date: Jul. 26, 2016

(87) PCT Pub. No.: WO2015/115540
PCT Pub. Date: Aug. 6, 2015

(65) Prior Publication Data
US 2017/0010709 A1 Jan. 12, 2017

(30) Foreign Application Priority Data
Jan. 30, 2014 (JP) .................................. 2014-015497

(51) Int. Cl.
*H01B 5/14* (2006.01)
*G06F 3/00* (2006.01)
(Continued)

(52) U.S. Cl.
CPC ................ *G06F 3/044* (2013.01); *B32B 7/02* (2013.01); *G06F 3/045* (2013.01);
(Continued)

(58) Field of Classification Search
CPC ..................... G06F 3/044; G06F 3/041; G06F 2203/04104; G06F 3/045;
(Continued)

(56) References Cited

U.S. PATENT DOCUMENTS

| 2003/0043315 A1* | 3/2003 | Umemoto ......... G02F 1/133615 349/65 |
| 2011/0151215 A1* | 6/2011 | Kobayashi ................ B32B 7/02 428/212 |
| 2013/0169593 A1 | 7/2013 | Imamura et al. |

FOREIGN PATENT DOCUMENTS

| CN | 102214498 A | 10/2011 |
| JP | 2013-154574 A | 8/2013 |

(Continued)

OTHER PUBLICATIONS

Office Action dated Jun. 16, 2017, issued in counterpart Japanese Application No. 2014-015497, with English machine translation. (7 pages).
(Continued)

*Primary Examiner* — Muhammad N Edun
(74) *Attorney, Agent, or Firm* — Westerman, Hattori, Daniels & Adrian, LLP (57) ABSTRACT

Provided are a double-sided transparent conductive film which has blocking resistance and a low reflectance, and is inhibited from scattering reflected light to exhibit good visibility; a roll thereof; and a touch panel. The double-sided transparent conductive film of the present invention includes a base material film with an optical adjusting layer laminate and a transparent conductive layer formed in this order on (Continued)

each of both sides, the optical adjusting layer laminate including two or more optical adjusting layers, wherein the optical adjusting layers have different refractive indexes in each of the optical adjusting layer laminates, an anti-blocking layer containing particles is formed between the base material film and at least one of the optical adjusting layer laminates, the anti-blocking layer includes a flat portion, and a protrusion portion resulting from the particles, a value obtained by subtracting a value of a thickness of the flat portion of the anti-blocking layer from a value of a mode diameter of the particles is larger than a value of a thickness of the optical adjusting layer laminate, and the optical adjusting layer laminates each have a thickness of not less than 60 nm and not more than 250 nm.

9 Claims, 2 Drawing Sheets (51) Int. Cl.
    *G06F 3/044*     (2006.01)
    *B32B 7/02*     (2006.01)
    *G06F 3/045*     (2006.01)
    *G06F 3/041*     (2006.01)

(52) U.S. Cl.
    CPC ... *B32B 2307/202* (2013.01); *B32B 2307/412* (2013.01); *B32B 2307/536* (2013.01); *B32B 2457/208* (2013.01); *G06F 3/041* (2013.01); *G06F 2203/04103* (2013.01); *G06F 2203/04104* (2013.01)

(58) Field of Classification Search
    CPC ..... G06F 2203/04103; B32B 2307/536; B32B 7/02; B32B 2457/208; B32B 2307/412; B32B 2307/202
    See application file for complete search history.

(56)     References Cited

FOREIGN PATENT DOCUMENTS

| TW | 201118463 A | 6/2011 |
|---|---|---|
| WO | 2008/123101 A1 | 10/2008 |
| WO | 2011/065032 A1 | 6/2011 |

OTHER PUBLICATIONS

International Search Report dated Apr. 7, 2015, issued in counterpart International Application No. PCT/JP2015/052510 (1 page).
Office Action dated Feb. 19, 2016, issued in counterpart Taiwanese Application No. 104103329.
Notification of Transmittal of Translation of the International Preliminary Report on Patentability (Form PCT/IB/338) issued in counterpart International Application No. PCT/JP2015/052510 dated Aug. 11, 2016, with Forms PCT/IB/373 and PCT/ISA/237. (8 pages).

* cited by examiner

DOUBLE-SIDED TRANSPARENT CONDUCTIVE FILM AND TOUCH PANEL

TECHNICAL FIELD

The present invention relates to a double-sided transparent conductive film, and a touch panel.

BACKGROUND ART

In recent years, projected-capacitive touch panels or matrix-type resistive touch panels can attain multi-point input (multi-touch) to be excellent in operability. Demands therefor have been rapidly increasing. As an electrode member of such a touch panel, a double-sided transparent conductive film is suggested, in which transparent conductive thin films are formed on both sides of a transparent film base material, respectively.

A touch panel as described above makes use of a double-sided transparent conductive film having patterned transparent conductive layers. As the material of the transparent conductive layers, indium/tin composite oxide (ITO) is widely used from the viewpoint of the visible ray transmittance thereof. However, the refractive index of ITO is high. Thus, when a transparent conductive layer containing ITO is patterned, a difference is generated in pattern-visibility between its part in which the transparent conductive layer constitutes the pattern (pattern-formed part) and its part in which the transparent conductive layer does not exist (pattern opening part). Accordingly, when the pattern is observed from the outside, the touch panel may be deteriorated in appearance or a hue (color tone) may be generated. In order to make such a pattern inconspicuous, in a double-sided transparent conductive film having, on its both sides, transparent conductive layers, respectively, suggested is a technique of providing an optical adjusting layer between the film base material and the transparent conductive layer (Patent Document 1).

PRIOR ART DOCUMENTS

Patent Documents

Patent Document 1: WO 2011/065032

SUMMARY OF THE INVENTION

Problems to be Solved by the Invention

In the above-mentioned technique, for the formation of the optical adjusting layer, a drying process such as sputtering is adopted, but it is desired to use a wet coating process since this process makes it possible to attain continuous production in a roll-to-roll manner to decrease costs. However, in the roll-to-roll manner, films superimposed onto each other may adhere closely to each other and may become hard to be peeled from each other (the so-called blocking). In some cases, the films may be broken or scratched to be declined in productivity.

In order to restrain blocking against such a problem, a countermeasure can be adopted which includes the formation of an anti-blocking layer having a surface in which irregularities are formed on the base material. However, when an optical adjusting layer is formed on an anti-blocking layer by a wet coating method, there may be cases where a protrusion portion of the anti-blocking layer is covered with a coating solution, so that sufficient blocking resistance is not exhibited. In formation of an optical adjusting layer by a wet coating method, there may be cases where a coating solution spreads to a low part on the periphery of a protrusion portion in accordance with the inclination of the protrusion portion to cause a change in thickness of the optical adjusting layer at the protrusion portion and the part to which the coating solution spreads, and as a result, an intended optical design is not obtained, and thus reflected light is scattered to impair visibility.

In addition, technical development has been recently directed to reducing the reflectances of the constituent members (cover glass, polarizing plate and so on) of a module for the purpose of further improving visibility of the whole of a display device. In conformity of this direction, further reduction of the reflectance of a touch panel including a transparent conductive film has been demanded.

In view of the situations described above, an object of the present invention is to provide a double-sided transparent conductive film which has blocking resistance and a low reflectance, and is inhibited from scattering reflected light to exhibit good visibility; a wound body thereof; and a touch panel.

Means for Solving the Problems

In order to solve the problems, the inventors have made eager investigations to find out that the object can be attained by setting the particle diameter of particles in an anti-blocking layer and the thickness of an optical adjusting layer to satisfy a specific relationship, and providing a specific layer structure to the optical adjusting layer.

That is, the present invention is a double-sided transparent conductive film including a base material film with an optical adjusting layer laminate and a transparent conductive layer formed in this order on each of both sides, the optical adjusting layer laminate including two or more optical adjusting layers, wherein the optical adjusting layers have different refractive indexes in each of the optical adjusting layer laminates,
an anti-blocking layer containing particles is formed between the base material film and at least one of the optical adjusting layer laminates,
the anti-blocking layer includes a flat portion, and a protrusion portion resulting from the particles,
a value obtained by subtracting a value of a thickness of the flat portion of the anti-blocking layer from a value of a mode diameter of the particles is larger than a value of a thickness of the optical adjusting layer laminate, and
the optical adjusting layer laminates each have a thickness of not less than 60 nm and not more than 250 nm.

In this double-sided transparent conductive film, the optical adjusting layers are provided between the base material film and the individual transparent conductive layers in such a manner that an optical design can be attained in a relationship between the optical adjusting layers and the transparent conductive layers formed in the respective both sides of the base material film. Thus, even when the transparent conductive layers are patterned, the pattern can be made inconspicuous and the generation of a hue can be restrained so that the double-sided transparent conductive film can attain a good appearance. In particular, since an optical adjusting layer laminate including two or more optical adjusting layers having different refractive indexes is provided on each of both sides of a base material film, not only reflection on the surface side but also reflection on the back surface side can be suppressed, so that the reflectance of the transparent conductive film as a whole can be reduced.

Moreover, the value obtained by subtracting the value of the thickness of the flat portion of the anti-blocking layer from the value of the mode diameter of the particles is made larger than the value of the thickness of the optical adjusting layer; thus, even when the optical adjusting layer is formed by wet coating, the protrusion portions of the anti-blocking layer are not buried. In other words, protrusions are present also in the optical adjusting layer, the protrusions being caused by the protrusion portions of the underlying anti-blocking layer. As a result, the double-sided transparent conductive film can exhibit excellent anti-blocking property.

As described above, in the double-sided transparent conductive film, the reflectance is reduced by employing an optical adjusting layer laminate including two or more optical adjusting layers. It is considered that when two or more optical adjusting layers are formed by wet coating as described above, the coating solution more markedly spreads to the periphery of the protrusion portion as compared to a case where one optical adjusting layer is formed, so that an optical design on the periphery of the protrusion portion cannot be satisfied, and thus scattering of reflected light occurs. On the other hand, in the double-sided transparent conductive film, each optical adjusting layer laminate has a small thickness of not less than 60 nm and not more than 250 nm, and therefore spreading of the coating solution to the periphery of the protrusion portion in formation of each optical adjusting layer by wet coating can be considerably suppressed. In this way, an optical design on the periphery of the protrusion portion can be satisfied, so that scattering of reflected light can be suppressed to achieve good visibility.

Further, since the double-sided transparent conductive film is capable of maintaining blocking resistance and being inhibited from scattering reflected light even when the optical adjusting layer is formed by wet coating, the double-sided transparent conductive film can be continuously produced in a roll-to-roll method, inclusive of formation of the optical adjusting layer, and thus can be produced at a low cost.

The optical adjusting layers are each preferably a layer formed by wet coating. This makes it possible to form the optical adjusting layers in a roll-to-roll manner to reduce costs for the production.

In the double-sided transparent conductive film, a specific layer structure is employed, and therefore the reflectance can be reduced to 1.2% or less, so that excellent visibility can be exhibited.

A value obtained by subtracting the value of the thickness (nm) of the flat portion of the anti-blocking layer from the value of the mode diameter (nm) of the particles is preferably not less than 200 nm and not more than 1200 nm. When the difference between the mode diameter and the thickness of the flat portion is 200 nm or more, elimination of the protrusion portion of the anti-blocking layer in formation of the optical adjusting layer by wet coating can be prevented to exhibit blocking resistance. On the other hand, when the above-mentioned difference is 1200 nm or less, spreading of the coating solution for the optical adjusting layer to the periphery of the protrusion portion can be reduced to such a Level that visibility is not affected.

Preferably, at least one of the optical adjusting layers is formed of an organic-inorganic composite material including an organic component and an inorganic component. By using an inorganic component in combination with an organic component, the viscosity of a coating solution containing an organic-inorganic composite material can be efficiently adjusted to be in a range which is suitable for wet coating and ensures that spreading of the coating solution to the periphery of the protrusion portion can be suppressed. Addition of an inorganic component facilitates adjustment of the optical characteristics of the optical adjusting layer, so that the reflectance of the transparent conductive film can be further reduced.

However, it has been found that when the optical adjusting layer is formed from an organic-inorganic composite material, external appearance defects in the form of small projections may occur in addition of scattering of reflected light which is caused by spreading of the coating solution to the periphery of the protrusion portion. The external appearance defects may result from generation of irregularities on the surface of the optical adjusting layer depending on the size of the inorganic component like the mechanism in which scattering of reflected light occurs at the protrusion portion. Accordingly, it is preferable that the value of the median diameter of the inorganic component is made smaller than the value of the thickness of the optical adjusting layer, so that surface irregularities which are caused by the inorganic component are inhibited to suppress light scattering.

It is preferable that the transparent conductive layer is patterned, and it is preferable that the double-sided transparent conductive film includes a pattern-formed part where the transparent conductive layer forms a pattern, and a pattern opening part where the transparent conductive layer does not exist. By specifically patterning the transparent conductive layer, the double-sided transparent conductive film can be suitably used particularly in a capacitance touch panel.

The base material film preferably includes a cycloolefin-based resin. This makes it possible to heighten the double-sided transparent conductive film further in transparency so that this film can attain a good appearance.

The present invention also relates to a double-sided transparent conductive film wound body including a long body of the double-sided transparent conductive film wound in a roll form.

The present invention is further directed to a touch panel including the double-sided transparent conductive film.

MODE FOR CARRYING OUT THE INVENTION

An embodiment of the present invention will be described below with reference to the drawings. The form illustrated in each of the drawings is not an actual ratio, and is illustrated in a partially enlarged or reduced scale for the convenience of the description. In the present specification, the terms each denoting a positional relationship, such as the terms "upper", "lower", "right", "left", "front" and "rear", are terms merely for making the description easy, and each never have an intention of specifying the positional relationship of actual and specific structural elements.

<Double-Sided Transparent Conductive Film>

Figure 1:
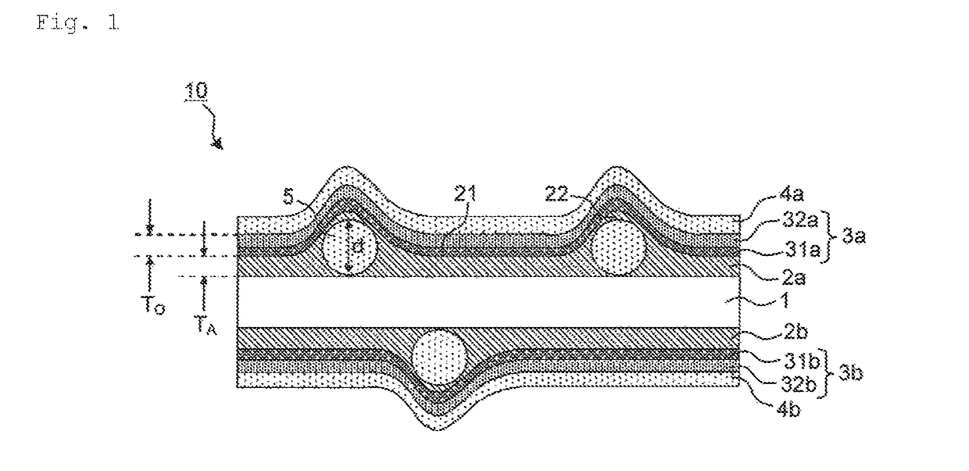
FIG. 1 is a schematic sectional view of a double-sided transparent conductive film according to an embodiment of the present invention.

FIG. 1 is a sectional view which schematically illustrates an embodiment of the double-sided transparent conductive film according to the present invention. In a double-sided transparent conductive film 10, on both sides of a base material film 1 are successively formed the following respective layers: anti-blocking layers 2a and 2b (hereinafter both layers are collectively referred to also as the anti-blocking layer 2) each containing particles 5; optical adjusting layer laminates 3a and 3b (hereinafter both layers are collectively referred to also as the optical adjusting layer laminate 3); and transparent conductive layers 4a and 4b (hereinafter both layers are collectively referred also as the transparent conductive layer 4). The optical adjusting layer laminate 3a has a two-layer structure in which an optical adjusting layer 31a and an optical adjusting layer 32a are stacked from a side close to the base material film 1. The optical adjusting layer laminate 3b has the same structure as that of the optical adjusting layer laminate 3a.

In FIG. 1, the anti-blocking layers 2a and 2b are formed on the both sides of the base material film 1. However, an anti-blocking layer may be formed on only one of the upper surface and the lower surface of the base material film 1. Regarding each of the anti-blocking layer 2, the optical adjusting layer laminate 3, and the transparent conductive layer 4, the structure thereof at one side of the base material film 1 may be identical with that at the other side; thus, hereinafter, a description will be mainly made regarding the structure at the upper surface side of the base material film 1 in FIG. 1.

The anti-blocking layer 2a has, on a surface thereof, a flat portion 21 and protrusion portions 22. The formation of the protrusion portions 22 is caused by respective particles 5. In the double-sided transparent conductive film 10, the value obtained by subtracting the value of the thickness $T_A$ of the flat portion 21 of the anti-blocking layer 2a from the value of the mode diameter d of the particles 5 is larger than the value of the thickness $T_o$ of the optical adjusting layer laminate 3a. When the optical adjusting layers 31a, 32a are formed by wet coating, the flat portion 21 of the anti-blocking layer 2a is buried by the optical adjusting layers 31a, 32a so that the height of the protrusion portion 22 is relatively decreased. Thus, the anti-blocking layer 2a may lose blocking resistance. The double-sided transparent conductive film 10 is formed in such a manner that the mode diameter d of the particles 5, the thickness $T_A$ of the flat portion 21 and the thickness $T_o$ of the optical adjusting layer 3a satisfy the specific relationship. Thus, even when the optical adjusting layers 31a, 32a are formed by wet coating, the protrusion portions 22 of the anti-blocking layer 2a can be prevented from being buried. As a result, the protrusion portions 22 can cause the generation of protrusions also in the surface of the optical adjusting layer laminate 3a, so that the double-sided transparent conductive film can exhibit good anti-blocking property. In FIG. 1, the particles 5 having the mode diameter d have been illustrated. However, the anti-blocking layer 2a may contain particles having a particle diameter other than the mode diameter d as far as the advantageous effects of the present invention are not damaged.

In the double-sided transparent conductive film 10, usually, the thickness of the anti-blocking layer 2a is set into the order of micrometers while the thickness of each of the optical adjusting layer laminate 3a and the transparent conductive layer 4a is set into the order of nanometers, which is a very small thickness. Thus, the transparent conductive layer 4a as the outermost surface layer follows the protrusions of the optical adjusting layer laminate 3a to have protrusions. This is the same as in the lower surface side of the base material film 1 in FIG. 1.

The reflectance of the double-sided transparent conductive film 10 can be appropriately set in view of optical characteristics required for the display module, and is preferably 1.2% or less, more preferably 1.0% or less, further preferably 0.8% or less.

The haze of the double-sided transparent conductive film is not particularly limited as far as the film can ensure required transparency. The haze is preferably 5% or less, more preferably 4% or less, even more preferably 3% or less. The lower limit of the haze is preferably 0%. In many cases, however, the haze is generally 0.3% or more by the presence of the protrusions in the outermost surface layers, and so on.

<Base Material Film>

The base material film 1 is not particularly limited, and various kinds of plastic films having transparency are used. Examples of the material thereof include a polyester-based resin, an acetate-based resin, a polyether sulfone-based resin, a polycarbonate-based resin, a polyamide-based resin, a polyimide-based resin, a polyolefin-based resin, a polycycloolefin-based resin such as a polynorbornene-based resin, a (meth)acryl-based resin, a polyvinyl chloride-based resin, a polyvinylidene chloride-based resin, a polystyrene-based resin, a polyvinyl alcohol-based resin, a polyarylate-based resin and a polyphenylene sulfide-based resin. Among them preferable are a polycycloolefin-based resin, a polyester-based resin, a polycarbonate-based resin and a polyolefin-based resin. A polycycloolefin-based resin is especially preferable.

The thickness of the base material film 1 is preferably in a range of 2 to 200 μm, more preferably in a range of 20 to 180 μm. If the thickness of the base material film 1 is less than 2 μm, the mechanical strength of the base material film 1 may become insufficient, thus making it difficult to perform an operation to continuously form the optical adjusting layer laminate 3 and the transparent conductive layer 4 with the film base material formed in a roll shape. On the other hand, if the thickness is more than 200 μm, the scratch resistance of the transparent conductive layer 4 and dotting property as intended for use in a touch panel may not be improved.

The surface of the base material film 1 may be subjected beforehand to an etching treatment or a undercoating treatment such as sputtering, plasma treatment, corona discharge, flame, ultraviolet-ray irradiation, electron-beam irradiation, chemical conversion or oxidation to improve adhesion with an anti-blocking layer, an optical adjusting layer and the like which are formed on the film base material. The surface of the film base may be freed from dust and cleaned by solvent cleaning or ultrasonic cleaning as necessary before the anti-blocking layer and the optical adjusting layer are formed.

<Anti-Blocking Layer>

The anti-blocking layer 2 includes the flat portion 21 and the protrusion portion 22 on the surface as described above. The protrusion portion 22 results from particles 5 contained in the anti-blocking layer 2. Here, a value $d-T_A$ obtained by subtracting the value of the thickness $T_A$ of the flat portion 21 of the anti-blocking layer 2a from the value of the mode diameter d of particles 5 is preferably not less than 200 nm and not more than 1200 nm, more preferably not less than 400 nm and not more than 1100 nm, further preferably not less than 600 nm and not more than 1000 nm from the view point of blocking resistance and prevention of scattering of reflected light on the periphery of the protrusion portion. When the value d-$T_A$ is excessively small, sufficient blocking resistance may not be obtained, and when the value d-$T_A$ is excessively large, the optical adjusting layer forming coating solution may markedly spread to the periphery of the protrusion portion 22 to cause scattering of reflected light, leading to impairment of visibility.

The mode diameter of particles can be appropriately set in consideration of the size of the protrusion portion of the outermost surface layer, the thickness of the flat portion 21 of the anti-blocking layer 2 and so on, and is not particularly limited. From the viewpoint of sufficiently imparting blocking resistance to the double-sided transparent conductive film and sufficiently suppressing scattering of reflected light around the protrusion portion, the mode diameter of particles is preferably 700 nm or more and 4000 nm or less, more preferably 900 nm or more and 3000 nm or less, more preferably 1100 nm or more and 2500 nm or less. The "mode diameter" as used herein refers to a particle diameter showing a maximum value in the particle distribution, and can be determined by making a measurement under predetermined conditions (Sheath liquid: ethyl acetate, measurement mode: HPF measurement, measurement method: total count) using a flow-type particle image analyzer (manufactured by Sysmex Corporation, trade name "FPIA-3000S"). Particles are diluted to 1.0% by weight with ethyl acetate, and uniformly dispersed using an ultrasonic cleaning machine, and the dispersion thus obtained is used as a measurement sample.

Preferably, the thickness of the flat portion 21 of the anti-blocking layer 2 is selected so as to satisfy the above-mentioned value d-$T_A$. Specifically, the thickness of the flat portion 21 is not less than 500 nm and not more than 3000 nm, more preferably not less than 700 nm and not more than 2500 nm, further preferably not less than 900 nm and not more than 2000 nm. When the thickness of the flat portion of the anti-blocking layer is excessively small, the value d-$T_A$ becomes relatively large, spreading of the coating solution for the optical adjusting layer to the periphery of the protrusion portion may be no longer ignored, thus causing light scattering. On the other hand, when the thickness of the flat portion of the anti-blocking layer is excessively large, the value d-$T_A$ becomes relatively small, so that the protrusion portion may be buried in formation of the optical adjusting layer, leading to reduction of blocking resistance. In this specification, the thickness of the flat portion of the anti-blocking layer is an average thickness in the flat portion of the anti-blocking layer.

The particles may be polydisperse particles or monodisperse particles, but the particles are preferably monodisperse particles in light of ease of adding a protrusion portion and an anti-glittering property. In the case of monodisperse particles, the particle size can be considered substantially identical to the mode diameter.

The content of particles in the anti-blocking layer is preferably 0.01 to 5 parts by weight, more preferably 0.02 to 1 parts by weight, further preferably 0.05 to 0.5 parts by weight based on 100 parts by weight of solid content of the resin composition. If the content of particles in the anti-blocking layer is low, a protrusion portion sufficient to impart blocking resistance to the surface of the anti-blocking layer may become hard to be formed. On the other hand, if the content of particles is excessively high, the haze of the double-sided transparent conductive film may be increased due to light scattering by particles to deteriorate visibility. Further, if the content of particles is excessively high, streaks may occur during formation of the anti-blocking layer (during application of a solution), leading to deterioration of visibility and nonuniformity in electrical property of the transparent conductive layer.

(Resin Composition)

As a resin composition that forms the anti-blocking layer 2, one which is capable of dispersing particles, has a sufficient strength as a film after formation of the anti-blocking layer and has transparency can be used without particular limitation. Examples of the resin to be used include a thermosetting resin, a thermoplastic resin, an ultraviolet-ray curing-type resin, an electron-beam curing-type resin and a two-component mixing type resin, and among them, an ultraviolet-ray curing-type resin is preferred with which a film can be formed efficiently by a simple processing operation of a curing treatment by ultraviolet-ray irradiation.

Examples of the ultraviolet-ray curing-type resin include various kinds such as polyester-based, acryl-based, urethane-based, amide-based, silicone-based and epoxy-based ultraviolet-ray curing-type resins, which include ultraviolet-ray curing-type monomers, oligomers and polymers. Examples of the ultraviolet-ray curing-type resin that is preferably used include those having an ultraviolet-ray polymerizable functional group, particularly those containing an acryl-based monomer or oligomer component having 2 or more, particularly 3 to 6 such functional groups. Further, the ultraviolet-ray curing-type resin contains an ultraviolet-ray polymerization initiator.

For the resin layer forming material, additives such as a leveling agent, a thixotropy agent and an antistatic agent can be used in addition to the aforementioned materials. Use of a thixotropy agent is advantageous for formation of protruding particles in a fine unevenness-shaped surface. Examples of the thixotropy agent include silica and mica, each of which has a size of 0.1 μm or less. It is preferred that the content of these additives is normally about 15 parts or less by weight, preferably 0.01 to 15 parts by weight based on 100 parts by weight of the ultraviolet-ray curing-type resin.

(Particles)

For particles that are contained in the anti-blocking layer 2, those having transparency, such as various kinds of metal oxides, glass and plastic, can be used without particular limitation. Examples thereof include inorganic particles such as silica, alumina, titanium, zirconia and calcium oxide, crosslinked or uncrosslinked organic particles formed of various kinds of polymers such as polymethyl methacrylate, polystyrene, polyurethane, acryl-based resins, acryl-styrene copolymers, benzoguanamine, melamine and polycarbonate, and silicone-based particles. One kind or two or more kinds of particles can be appropriately selected from the aforementioned particles, and used, but organic particles are preferred. As organic particles, acryl-based resins are preferred in terms of a refractive index.

(Coating Composition)

A coating composition that is used for forming the anti-blocking layer includes the above-described resin, particles and solvent. To the coating composition can be added various additives as necessary. Examples of these additives include usual additives such as an antistatic agent, a plasticizer, a surfactant, an antioxidant and an ultraviolet-ray absorber.

The coating composition is prepared by mixing the above-described resin and particles with a solvent, additives, a catalyst and so on as necessary. The solvent in the coating composition is not particularly limited, and is appropriately selected in consideration of a resin used, a material of a portion as a coating ground and a method for applying the composition. Specific examples of the solvent include aromatic solvents such as toluene and xylene; ketone-based solvents such as methyl ethyl ketone, acetone, methyl isobutyl ketone and cyclohexanone; ether-based solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole and phenetole; ester-based solvents such as ethyl acetate, butyl acetate, isopropyl acetate and ethylene glycol diacetate; amide-based solvents such as dimethyl formamide, diethyl formamide and N-methylpyrrolidone; cellosolve-based solvents such as methyl cellosolve, ethyl cellosolve and butyl cellosolve; alcohol-based solvents such as methanol, ethanol and propanol; and halogen-based solvents such as dichloromethane and chloroform. These solvents may be used alone, or used in combination two or more thereof. Among these solvents, ester-base solvents, ether-based solvents, alcohol-based solvents and ketone-based solvents are preferably used.

In the coating composition, preferably particles are dispersed in a solution. As a method for dispersing particles in a solution, various known methods can be employed such as a method in which particles are added to a resin composition solution, and the mixture is mixed, and a method in which particles dispersed in a solvent beforehand are added to a resin composition solution.

The solid concentration of the coating composition is preferably 1% by weight to 70% by weight, more preferably 2% by weight to 50% by weight, most preferably 5% by weight to 40% by weight. If the solid concentration is excessively low, variations in the protrusion portion of the surface of the anti-blocking layer increase during a drying step after application, and the haze of an area of the surface of the anti-blocking layer, where the protrusion portion becomes larger, may be increased. On the other hand, if the solid concentration is excessively high, contained components tend to aggregate, and as a result, the aggregation areas may become apparent to deteriorate the appearance of the double-sided transparent conductive film.

(Application and Curing)

The anti-blocking layer is formed by applying the coating composition onto a base material. Application of the coating composition onto the base material film 1 is conducted for both surfaces of the base material in this embodiment. The coating composition may be applied directly onto the base material film 1, or may be applied onto an undercoat layer or the like formed on the base material film 1.

A method for applying the coating composition can be appropriately selected according to a coating composition and a situation of an application step, and application can be performed using, for example, a dip coating method, an air knife method, a curtain coating method, a roller coating method, a wire bar coating method, a gravure coating method, a die coating method or an extrusion coating method.

The anti-blocking layer can be formed by curing the coating film after applying the coating composition. When the resin composition is photocurable, it is possible to cure by irradiating with light using a light source which emits light having a wavelength as needed. As light to irradiate the resin composition, for example, light with an exposure amount of 150 mJ/cm$^2$ or more, preferably light with an exposure amount of 200 mJ/cm$^2$ to 1000 mJ/cm$^2$ can be used. The wavelength of the irradiation light is not particularly limited, and for example, irradiation light having a wavelength of 380 nm or less can be used. Heating may be performed at the time of the photocuring treatment or after the photocuring treatment.

The surface of the anti-blocking layer 2 may be subjected beforehand to an etching treatment or a undercoating treatment such as sputtering, plasma treatment, corona discharge, flame, ultraviolet-ray irradiation, electron-beam irradiation, chemical conversion or oxidation to improve adhesion with an optical adjusting layer and the like which are formed on the anti-blocking layer. The surface of the anti-blocking layer may be freed from dust and cleaned by solvent cleaning or ultrasonic cleaning as necessary before the optical adjusting layer is formed.

<Optical Adjusting Layer Laminate>

In the double-sided transparent conductive film 10 of this embodiment, the optical adjusting layer laminate 3 is provided between the anti-blocking layer 2 and the transparent conductive layer 4 for the purpose of, for example, controlling the adhesion and reflection characteristics of the transparent conductive layer. The optical adjusting layer laminate 3a has a two-layer structure in which the optical adjusting layer 31a and the optical adjusting layer 32a are stacked from a side close to the base material film 1. The optical adjusting layer 31a and the optical adjusting layer 32a have mutually different refractive indexes. The layer structure of the optical adjusting layer laminate 3a is not limited to a two-layer structure, and may be a three or more-layer structure.

The optical adjusting layer laminates 3a and 3b may each independently have a thickness of not less than 60 nm and not more than 250 nm, preferably not less than 70 nm and not more than 200 nm, more preferably not less than 80 nm and not more than 150 nm. When the optical adjusting layer laminate is in the above-mentioned range, spreading of the coating solution to the periphery of the protrusion portion in formation of the optical adjusting layers by wet coating can be considerably suppressed. Accordingly, an optical design on the periphery of the protrusion portion can be satisfied, so that scattering of reflected light can be suppressed. When the thickness of the optical adjusting layer laminate is excessively small, it may be unable to sufficiently control reflection characteristics, leading to impairment of visibility of the transparent conductive film. When the thickness of the optical adjusting layer laminate is excessively large, the coating solution may markedly spread, leading to occurrence of scattering of reflected light. When the optical adjusting layer laminate is formed with a thickness at a nano-order level as described above, a surface of the optical adjusting layer laminate on the transparent conductive layer 4 side mostly maintains the elevated shape on the surface of the anti-blocking layer 2 that is an under-layer of the optical adjusting layer laminate. The elevated shape is also maintained on the surface of the transparent conductive layer 4, and therefore a double-sided transparent conductive film having blocking resistance can be provided.

[Optical Adjusting Layer]

While the optical adjusting layer 31a and the optical adjusting layer 32a may have mutually different refractive indexes, the refractive index of the optical adjusting layer 31a is preferably higher than the refractive index of the optical adjusting layer 32a for reducing the reflectance by controlling reflection characteristics at a higher level. Here, the refractive index of the optical adjusting layer 31a is preferably not less than 1.60 and not more than 1.90, more preferably not less than 1.70 and not more than 1.80. The refractive index of the optical adjusting layer 32a is preferably not less than 1.35 and not more than 1.60, more preferably not less than 1.45 and not more than 1.55.

The optical adjusting layer may be formed of any of an organic component, an inorganic component, and an organic-inorganic composite material including an organic component and an inorganic component. Particularly, at least one optical adjusting layer is preferably formed of an organic-inorganic composite material including an organic component and an inorganic component. Use of an inorganic component in combination with an organic component is preferable because the viscosity of a coating solution containing an organic-inorganic composite material can be efficiently adjusted to be in a range which is suitable for wet coating and ensures that spreading of the coating solution to the periphery of the protrusion portion can be suppressed. Addition of an inorganic component facilitates adjustment of the optical characteristics of the optical adjusting layer, so that the reflectance of the transparent conductive film can be further reduced.

(Organic Component)

An ultraviolet curable resin, a thermosetting resin, and a thermoplastic resin or the like are used as the organic component without particular limitation. From the viewpoint of a fast processing speed, and suppressing thermal damage of the transparent polymer base material 1, the ultraviolet curable resin is particularly preferably used.

For example, a curable compound having at least one of an acrylate group and a methacrylate group which is curable by light (ultraviolet rays) can be used as such an ultraviolet curable resin. Examples of the curable compound include a silicone resin, a polyester resin, a polyether resin, an epoxy resin, an urethane resin, an alkyd resin, a spiroacetal resin, a polybutadiene resin, a polythiol-polyene resin, and oligomers or prepolymers of acrylate and methacrylate or the like of a multifunctional compound such as a polyhydric alcohol. These may be used alone or in a combination of two or more of them.

A reactive diluent may be contained in addition to each of the components as the ultraviolet curable resin used for the organic component of the organic-inorganic composite material. For example, a reactive diluent having at least one of an acrylate group and a methacrylate group can be used as the reactive diluent. A reactive diluent described in, for example, JP-A-2008-88309 can be used as the specific example of the reactive diluent. Examples thereof include monofunctional acrylate, monofunctional methacrylate, polyfunctional acrylate, and polyfunctional methacrylate. The reactive diluent is preferably trifunctional or higher-functional acrylate or trifunctional or higher-functional methacrylate. This is because they can improve the hardness of the hard coat layer. Another examples of the reactive diluent include butanediol glycerin ether diacrylate; acrylate of isocyanuric acid; and methacrylate of isocyanuric acid. These may be used alone or in a combination of two or more of them.

(Inorganic Component)

The organic-inorganic composite material contains an organic component such as an ionizing radiation curable resin, and an inorganic component. Examples of the inorganic component include fine particles or fine powder made of inorganic oxide such as silicon oxide (silica), titanium oxide, aluminum oxide, zinc oxide, tin oxide, and zirconium oxide or the like. Among them, from the viewpoint of controlling the refractive index of the hard coat layer, the fine particles made of silicon oxide (silica), titanium oxide, aluminum oxide, zinc oxide, tin oxide, and zirconium oxide are preferable, and silicon oxide is particularly preferable. These may be used alone or in a combination of two or more of them.

The value of the median diameter of the inorganic component is preferably smaller than the value of the thickness of the optical adjusting layer. When the optical adjusting layer is formed from an organic-inorganic composite material, external appearance defects in the form of projections with a relatively small size may be generated. It is considered that generation of the external appearance defects is caused by surface irregularities of the optical adjusting layer formed of an inorganic component. Accordingly, it is preferable that the value of the median diameter of the inorganic component is made smaller than the value of the thickness of the optical adjusting layer, so that surface irregularities which are caused by the inorganic component are inhibited to suppress light scattering.

The specific median diameter of the inorganic component is preferably 50 nm or less, more preferably 40 nm or less, further preferably 30 nm or less. When the mode diameter of nanoparticles is small as described above, scattering of visible light as described above is hard to occur, and a considerable increase in haze of the optical adjusting layer is suppressed even if the organic component and the nanoparticles in the organic-inorganic composite material have different refractive indexes. The lower limit of the median diameter of the inorganic component is preferably as small as possible, but the median diameter of the inorganic component is preferably 5 nm or more from the view point of prevention of aggregation for good dispersibility.

In this specification, the "median diameter" is a particle size (d50) at which the cumulative frequency in the particle size distribution shows 50%, and the median diameter of the inorganic component is determined by diluting a sample to a solid concentration of 1% with a diluent, and measuring the particle size distribution by a dynamic light scattering particle size distribution measurement apparatus ("LB-500" manufactured by HORIBA, Ltd.). The diluent is appropriately selected according to the type of the inorganic component and the type of surface modification of the inorganic component.

The inorganic oxide nanoparticles are preferably surface-modified with an organic compound having a polymerizable unsaturated group. The unsaturated group is reacted with the organic component in the organic-inorganic composite material to be cured, which can provide an increase in hardness of the hard coat layer. Preferable examples of the polymerizable unsaturated group in the organic compound with which the inorganic oxide nanoparticles are surface-modified include a (meth)acryloyl group, a vinyl group, a propenyl group, a butadienyl group, a styryl group, an ethynyl group, a cinnamoyl group, a maleate group, and an acrylamide group. The organic compound having the polymerizable unsaturated group may be a compound having a silanol group inside its molecule or a compound producing a silanol group through hydrolysis. It is preferable that the organic compound having the polymerizable unsaturated group has a photosensitive group.

The amount of the inorganic oxide nanoparticles contained in the organic-inorganic composite material is preferably 50 parts by weight to 300 parts by weight, and more preferably 100 parts by weight to 200 parts by weight based on 100 parts by weight of an organic component solid content such as the ionizing radiation curable resin. When the blending amount of inorganic oxide nanoparticles in the organic-inorganic composite material is in the above-mentioned range, spreading of the optical adjusting layer forming coating solution to the periphery of the protrusion portion can be suppressed to prevent scattering of light. It is also possible, for example, to adjust the refractive index of the optical adjusting layer.

(Additive Agent)

The material for forming the optical adjusting layer 3 may further contain various kinds of additive agents. For example, a polymerization initiator for curing the organic-inorganic composite material to form the optical adjusting layer, a leveling agent, a pigment, a filler, a dispersing agent, a plasticizer, an ultraviolet absorbing agent, a surfactant, an antioxidant, and a thixotropy-imparting agent or the like can be used as the additive agent.

Conventionally known photopolymerization initiators can be used as the polymerization initiator. For example, there can be used 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N,N-tetramethyl-4,4'-diaminobenzophenone, 1-(4-isopropylphenyl)-2-hydroxy-2-methylpropane-1-one, and other thioxanthone compounds or the like.

A fluorine or silicone leveling agent can be suitably used as the leveling agent. The leveling agent is more preferably a silicone leveling agent. Examples of the silicone leveling agent include polydimethylsiloxane, polyether-modified polydimethylsiloxane, and polymethylalkylsiloxane. The additive amount of the fluorine or silicone leveling agent is preferably 0.01 to 5 parts by weight based on a total of 100 parts by weight of the solid content of the organic component and inorganic component in the organic-inorganic composite material.

The optical adjusting layer can be suitably formed by a coating method such as a gravure coating method, a bar coating method, fountain coating, die coating, spin coating, spray coating or roll coating using the above-mentioned material. It is preferable that at least one optical adjusting layer is formed by a coating method as described above, but as a method for forming the other optical adjusting layers, a vacuum vapor deposition method, a sputtering method, an ion plating method or the like as well as the above-mentioned coating method may be employed.

Examples of the curing treatment include an energy irradiation method. For example, there are used radiation sources such as a high-pressure mercury lamp, a halogen lamp, a xenon lamp, a metal halide lamp, a nitrogen Laser, an electron beam accelerator, and a radioactive element as the energy radiation source. The amount of irradiation with the energy radiation source is preferably 50 to 5000 mJ/cm$^2$ in terms of accumulative exposure at an ultraviolet wavelength of 365 nm. When the amount of irradiation is less than 50 mJ/cm$^2$, insufficient curing is caused, which causes a decrease in the hardness of the optical adjusting layer 3. When the amount of irradiation exceeds 5000 mJ/cm$^2$, the optical adjusting layer 3 is colored, which causes deterioration in transparency.

<Transparent Conductive Layer>

The constituent material of the transparent conductive layer 4 is not particularly limited, and a metal oxide of at least one metal selected from the group consisting of indium, tin, zinc, gallium, antimony, titanium, silicon, zirconium, magnesium, aluminum, gold, silver, copper, palladium and tungsten is suitably used. The metal oxide may further contain metal atoms shown in the above-mentioned group as necessary. For example, indium oxide containing tin oxide (ITO), tin oxide containing antimony (ATO), and the like are preferably used.

The thickness of the transparent conductive layer 4 is not particularly limited, but is preferably 10 nm or more for forming a continuous film having such a good conductivity that its surface resistance is no higher than $1 \times 10^3 \Omega/\square$. If the thickness is excessively large, the transparency is deteriorated, and therefore the thickness is preferably 15 to 35 nm, more preferably in a range of 20 to 30 nm. If the thickness of the transparent conductive layer 4 is less than 15 nm, the electric resistance of the film surface increases, and a continuous film is hard to be formed. If the thickness of the transparent conductive layer 4 is more than 35 nm, deterioration of transparency or the like may be caused.

When the transparent conductive layer 4 is patterned, the refractive index of the transparent conductive layer 4 is preferably from about 1.85 to 2.1 in order to restrain a difference in reflectance between pattern-formed parts P and an pattern opening part O (see FIG. 2) and further restrain a difference in hue therebetween.

The method for forming the transparent conductive layer 4 is not particularly limited, and a previously known method can be employed. Specifically, for example, dry processes such as a vacuum deposition method, a sputtering method and an ion plating method can be shown as an example. An appropriate method can also be employed according to a required thickness. When the transparent conductive layer 4 is formed through a dry process such as a sputtering process, as illustrated in FIG. 1, the surface of the transparent conductive layer 4 substantially maintains the respective forms of the flat portion and the protrusion portions of the surface of the anti-blocking layer 2a, which is an underlying layer underneath the transparent conductive layer 4, (and the optical adjusting layer laminate 3). Accordingly, even when the optical adjusting layer laminate 3 and the transparent conductive layer 4 are formed on the anti-blocking layer 2, anti-blocking property can be favorably imparted to the surface of the transparent conductive layer 4.

The transparent conductive layer 4 can be crystallized by being subjected to a heating annealing treatment (for example, under an air atmosphere at 80 to 150° C. for about 30 to 90 minutes) as necessary. When the transparent conductive layer is crystallized, the resistance of the transparent conductive layer is reduced, and also transparency and durability are improved. By ensuring that the thickness the anti-blocking layer 2a falls within the above-described range in the double-sided transparent conductive film 10, occurrence of curl is suppressed at the time of heating annealing treatment, leading to excellent handling property.

Figure 2:
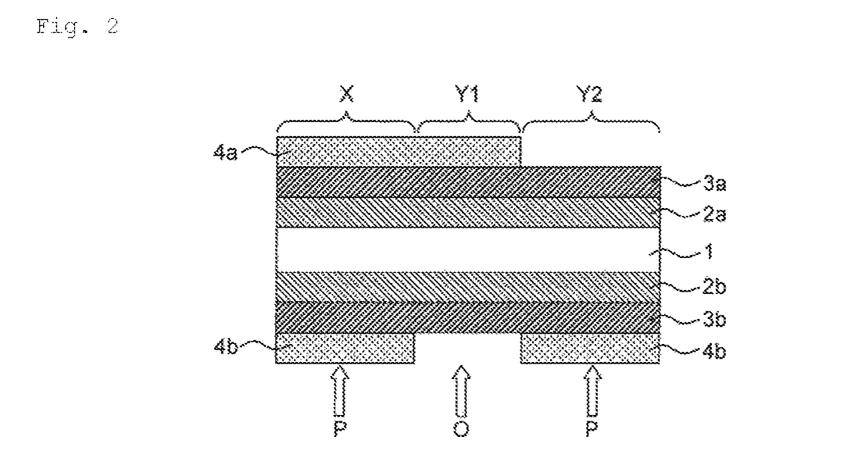
FIG. 2 is a schematic sectional view of the double-sided transparent conductive film according to another embodiment of the invention.
Figure 3:
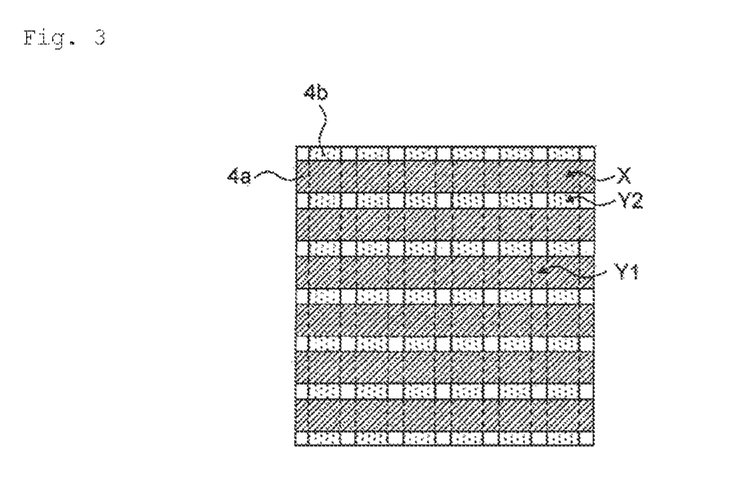
FIG. 3 is a partially transparent plan view which schematically illustrates an example of a pattern of a transparent conductive layer.

As illustrated in each of FIGS. 2 and 3, the transparent conductive layer 4 may be patterned by etching or the like. FIG. 2 illustrates a double-sided transparent conductive film 10 in which a transparent conductive layer 4 is patterned. For the convenience of a description, however, in FIG. 2, particles contained in an anti-blocking layer 2 and protrusion portions caused by the particles are omitted, and the thicknesses of the respective layers are different from those in the embodiment illustrated in FIG. 1. The double-sided transparent conductive film illustrated in FIG. 2 has pattern-formed parts P in which the transparent conductive layer 4 forms a pattern, and a pattern opening part O in which the transparent conductive layer 4 is removed. As illustrated in FIG. 3, in a double-sided transparent conductive film used in a capacitive touch panel or matrix-type resistive touch panel, it is preferred that the transparent conductive layers 4a and 4b are patterned into the form of stripes, and it is preferred that the transparent conductive layers 4a and 4b lie at right angles to each other to form a lattice-form matrix pattern. In FIG. 3, the width of the pattern-formed part P is illustrated to be larger than that of the pattern opening pare O. However, in the present invention, these are not limited into this form.

When the transparent conductive layers 4a and 4b of the double-sided transparent conductive film 10 are patterned as illustrated in each of FIGS. 2 and 3, the following may be preset in accordance with the form of the pattern upon seeing through the double-sided transparent conductive film in planar view: double-sided patterned regions X where the pattern-formed parts of the both sides overlap with each other; and single-side patterned regions Y (Y1 and Y2) having the pattern-formed parts on one side and the pattern opening part on the other side. In this case, the absolute value of the difference ΔR in reflectance between the double-sided patterned regions X and the single-side patterned regions Y is preferably 1% or less, more preferably 0.5% or less. Additionally, the reflected hue b* of the double-sided patterned regions X preferably satisfies −10≤b*≤0; more preferably, −8≤b*≤0; and even more preferably, −5≤b*≤0. When the absolute value of the reflectance difference ΔR and the reflected hue b* satisfy these ranges, the pattern-observation and the generation of a hue (particularly, a yellowish tone) can be restrained so that the transparent conductive film can be obtained to have a better appearance.

In the present specification, the "reflectance" denotes the luminous reflectance Y of light from a light source D65 of the CIE color coordinate system. The "hue" denotes the L* value, the a* value and the b* value of light from a light source D65 of the L*a*b* color coordinate system prescribed in JIS Z 8729. The "reflected hue" denotes a hue gained from reflected light.

A transparent conductive layer is generally made of a metal oxide, and therefore, the refractive index is high and the reflectance on the surface thereof is high. Accordingly, there is a tendency that a reflectance difference is generated between its pattern-formed parts P and its pattern opening part O so that the pattern is easily sighted. In contrast, in the present invention, the optical adjusting layer laminates are provided between the base material film 1 and the transparent conductive layers 4, respectively, at the front and rear surface sides, whereby interface multiple reflection cancels reflected light rays on the respective surfaces of the transparent conductive layers by interference so that the reflectance of the pattern-formed parts P is decreased. Thus, between the pattern-formed parts P and the pattern opening part O, the reflectance difference is decreased so that the pattern is not easily sighted.

<Double-Sided Transparent Conductive Film Wound Body>

In the present embodiment, the double-sided transparent conductive film 10 may be made into a long body. This long body can be made into a double-sided transparent conductive film wound body in which the long body is wound in a roll form. The wound body of the long double-sided transparent conductive film can be obtained by using, as its base material film, a long-sheet wound body in a roll form, and forming thereon each of the anti-blocking layers, the optical adjusting layers, and the transparent conductive layers as described above in a roll-to-roll manner. In formation of such a wound body, a protective film (separator) including a weakly adhesive layer may be laminated to the surface of the double-sided transparent conductive film, followed by winding the film in a roll shape, but since the double-sided transparent conductive film of this embodiment has improved slidability and blocking resistance, a wound body of a long sheet of double-sided transparent conductive film can be formed without using a protective film. That is, since blocking resistance is imparted, generation of scratches on the film surface at the time of handling is inhibited, and the film is excellent in winding property, so that a wound body is easily obtained by winding a long sheet in a roll shape without laminating a protective film to the surface. Thus, the double-sided transparent conductive film of this embodiment is capable of forming a wound body of a long sheet without using a protective film, and is therefore excellent in workability when used in subsequent formation of a touch panel. Further, the double-sided transparent conductive film contributes to cost reduction and waste reduction by eliminating necessity of a protective film as a process member.

<Touch Panel>

The double-sided transparent conductive film 10 can be suitably applied to, for example, a capacitive touch panel, a resistive touch panel and the like. In particular, even when the transparent conductive layers are patterned, the difference in visibility between the pattern-formed parts and the pattern opening part, in particular, the difference in reflectance therebetween can be restrained into a small level; thus, the film 10 is preferably usable in a touch panel having transparent conductive layers patterned into a predetermined form, such as a projected-capacitive touch panel or a resistive touch panel capable of attaining multi-point input.

For forming a touch panel, another substrate such as glass or a polymer film may be bonded onto any one or both of the main surfaces of the double-sided transparent conductive film through a transparent pressure-sensitive adhesive layer. The transparent substrate may be made of a single substrate film, or a laminate of two or more substrate films (for example, a laminate in which substrate films are laminated onto each other through a transparent pressure-sensitive adhesive layer). A hard coat layer may be provided onto the external surface of the transparent substrate that is bonded onto the double-sided transparent conductive film.

For the pressure-sensitive adhesive layer that is used for laminating the double-sided transparent conductive film and the base material, any material can be used without particular limitation as long as it has transparency. Specifically, for example, one having as a base polymer a polymer such as an acryl-based polymer, a silicone-base polymer, a polyester, a polyurethane, a polyamide, a polyvinyl ether, a vinyl acetate/vinyl chloride copolymer, a modified polyolefin, an epoxy-based polymer, a fluorine-based polymer, or a rubber-based polymer such as natural rubber or synthetic rubber can be appropriately selected and used. Particularly, an acryl-based pressure-sensitive adhesive is preferably used in terms of being excellent in optical transparency, showing adhesive property such as moderate wettability, cohesiveness and tackiness, and also being excellent in weather resistance and heat resistance.

When the above-described double-sided transparent conductive film according to the present invention is used for formation of a touch panel, it is excellent in handling property during formation of the touch panel. Therefore, touch panels excellent in transparency and visibility can be produced with high productivity.

EXAMPLES

The present invention will be described in detail below with Examples, but the present invention is not limited to Examples below as long as the spirit of the present invention is maintained, in examples, "part(s)" refers to "part(s) by weight" unless otherwise specified.

Example 1

A double-sided transparent conductive film having a configuration as shown in FIG. 1 was prepared in the following procedure. First, a coating composition containing a plurality of monodisperse particles with a mode diameter of 1.8 μm (1800 nm) (trade name "MX 180TAN" manufactured by Soken Chemical & Engineering Co., Ltd.) and a binder resin (trade name "UNIDIC RS29-120" manufactured by DIC Corporation), and having ethyl acetate as a solvent was provided. The coating composition contained 0.2 parts of particles based on 100 parts of the binder resin. Next, the coating composition was applied to both sides of a long base material film 1 (trade name "ZEONOR" manufactured by Zeon Corporation) with a thickness of 100 μm using a gravure coater in such a manner that a flat portion had a thickness of 1.0 μm (1000 nm) after drying, and the coating films were dried by performing heating at 80° C. for 1 minute. Thereafter, the coating films were irradiated with an ultraviolet ray with an accumulated light amount of 250 mJ/cm$^2$ using a high pressure mercury lamp, so that anti-blocking layers 2a and 2b were formed.

Next, a refractive index adjuster: an organic-inorganic composite component (trade name "OPSTAR Z7412" manufactured by JSR Corporation: an organic-inorganic composite material containing zirconium oxide particles with a median diameter of 40 nm as an inorganic component and having a refractive index of 1.62) was applied to the surfaces of the anti-blocking layers 2a and 2b on both sides using a gravure coater, and the coating films were dried by performing heating at 60° C. for 1 minute. Thereafter, the coating films were subjected to a curing treatment by irradiating the coating films with an ultraviolet ray with an accumulated light amount of 250 mJ/cm$^2$ using a high pressure mercury lamp, so that optical adjusting layers 31a and 31b having a thickness of 85 nm and a refractive index of 1.62 were formed on both sides. Further, a heat-curable refractive index adjuster produced by a sol-gel method (trade name "COLCOAT PX" manufactured by COLCOAT CO., Ltd.) was applied to the surfaces of the optical adjusting layers 31a and 31b using a gravure coater, and heated at 120° C. for 1 minute to form optical adjusting layers 32a and 32b having a thickness of 30 nm and a refractive index of 1.46 on both sides, so that optical adjusting layer laminates 3a and 3b were formed.

Thereafter, the long substrate having anti-blocking layers 2a and 2b and optical adjusting layer laminates 3a and 3b were introduced into a winding-type sputtering apparatus to stack 20 nm-thick indium tin oxide layers as transparent conductive layers 4a and 4b on the surfaces of optical adjusting layer laminates 3a and 3b on both sides (sputtering using a sintered body containing 97% by weight of indium oxide and 3% by weight of tin oxide in a 0.4 Pa atmosphere including 98% of an argon gas and 2% of an oxygen gas). Here, the optical adjusting layers and transparent conductive layers were stacked so as to extend the flat portion and the protrusion portion of the anti-blocking layer. In this way, a double-sided transparent conductive film 10 was prepared.

Example 2

A coating composition containing a plurality of monodisperse particles with a node diameter of 1.8 μm (1800 nm) (trade name "MX 180TAN" manufactured by Soken Chemical & Engineering Co., Ltd.) and a binder resin (trade name "UNIDIC RS29-120" manufactured by DIC Corporation), and having ethyl acetate as a solvent was provided. The costing composition contained 0.2 parts of particles based on 100 parts of the binder resin. Next, the coating composition was applied to both sides of a long base material film 1 (trade name "ZEONOR" manufactured by Zeon Corporation) with a thickness of 100 μm using a gravure coater in such a manner that a flat portion had a thickness of 1.0 μm (1000 nm) after drying, and the coating films were dried by performing heating at 80° C. for 1 minute. Thereafter, the coating films were irradiated with an ultraviolet ray with an accumulated light amount of 250 mJ/cm$^2$ using a high pressure mercury lamp, so that anti-blocking layers 2a and 2b were formed.

Next, a refractive index adjuster: an organic-inorganic composite component (trade name "OPSTAR Z7412" manufactured by JSR Corporation: an organic-inorganic composite material containing zirconium oxide particles with a median diameter of 40 nm as an inorganic component and having a refractive index of 1.62) was applied to the surfaces of the anti-blocking layers 2a and 2b on both sides using a gravure coater, and the coating films were dried by performing heating at 60° C. for 1 minute. Thereafter, the coating films were subjected to a curing treatment by irradiating the coating films with an ultraviolet ray with an accumulated light amount of 250 mJ/cm$^2$ using a high pressure mercury lamp, so that optical adjusting layers 31a and 31b having a thickness of 85 nm and a refractive index of 1.62 were formed on both sides. Further, a heat-curable refractive index adjuster produced by a sol-gel method (trade name "COLCOAT PX" manufactured by COLCOAT CO., Ltd.) was applied to the surfaces of the optical adjusting layers 31a and 31b using a gravure coater, and heated at 120° C. for 1 minute to form optical adjusting layers 32a and 32b having a thickness of 30 nm and a refractive index of 1.46 on both sides, so that optical adjusting layer laminates 3a and 3b were formed.

Thereafter, the long substrate having anti-blocking layers 2a and 2b and optical adjusting layer laminates 3a and 3b were introduced into a winding-type sputtering apparatus to stack 20 nm-thick indium tin oxide layers as transparent conductive layers 4a and 4b on the surfaces of optical adjusting layer laminates 3a and 3b on both sides (sputtering using a sintered body containing 97% by weight of indium oxide and 3% by weight of tin oxide in a 0.4 Pa atmosphere including 98% of an argon gas and 2% of an oxygen gas). Here, the optical adjusting layers and transparent conductive layers were stacked so as to extend the flat portion and the protrusion portion of the anti-blocking layer. In this way, a double-sided transparent conductive film 10 was prepared.

Example 3

Except that the median diameter of the inorganic component in the optical adjusting layer 31a was 25 nm, the same procedure as in Example 2 was carried out to prepare a double-sided transparent conductive film.

Example 4

Except that the thickness of each of the flat portions of the anti-blocking layers 2a and 2b was 1.5 μm (1500 nm), the same procedure as in Example 2 was carried out to prepare a double-sided transparent conductive film.

Example 5

Except that the thickness of each of the flat portions of the anti-blocking layers 2a and 2b was 0.5 μm (500 nm), the same procedure as in Example 2 was carried out to prepare a double-sided transparent conductive film.

Example 6

Except that the thickness of each of the optical adjusting layers 31a and 31b was 120 nm, and the thickness of each of the optical adjusting layers 32a and 32b was 5 nm, the same procedure as in Example 2 was carried out to prepare a double-sided transparent conductive film.

Example 7

Except that the thickness of each of the optical adjusting layers 31a and 31b was 30 nm, and the thickness of each of the optical adjusting layers 32a and 32b was 60 nm, the same procedure as in Example 2 was carried out to prepare a double-sided transparent conductive film.

Example 6

Except that the thickness of each of the optical adjusting layers 31a and 31b was 45 nm, and the thickness of each of the optical adjusting layers 32a and 32b was 200 nm, the same procedure as in Example 2 was carried out to prepare a double-sided transparent conductive film.

Example 9

Except that the thickness of each of the optical adjusting layers 31a and 31b was 45 nm, and the thickness of each of the optical adjusting layers 32a and 32b was 20 nm, the same procedure as in Example 2 was carried out to prepare a double-sided transparent conductive film.

Comparative Example 1

Except that the thickness of each of the flat portions of the anti-blocking layers 2a and 2b was 1.7 μm (1700 nm), the same procedure as in Example 1 was carried out to prepare a double-sided transparent conductive film.

Comparative Example 2

Except that the thickness of each of the optical adjusting layers 31a and 31b was 20 nm, and the thickness of each of the optical adjusting layers 32a and 32b was 25 nm, the same procedure as in Example 2 was carried out to prepare a double-sided transparent conductive film.

Comparative Example 3

Except that the thickness of each of the optical adjusting layers 31a and 31b was 210 nm, and the thickness of each of the optical adjusting layers 32a and 32b was 45 nm, the same procedure as in Example 2 was carried out to prepare a double-sided transparent conductive film.

Comparative Example 4

Except that the optical adjusting layers 32a and 32b were not formed, the same procedure as in Example 1 was carried out to prepare a double-sided transparent conductive film.

Comparative Example 5

Except that the thickness of each of the optical adjusting layers 31a and 31b was 115 nm, and the optical adjusting layers 32a and 32b were not formed, the same procedure as in Example 1 was carried out to prepare a double-sided transparent conductive film.

Evaluation

Regarding the double-sided transparent conductive film obtained in each of Examples 1 to 9 and Comparative Examples 1 to 5, evaluations described below were made. Respective results of the evaluations are shown in Table 1.

<Refractive Index of Critical Adjusting Layer>

Prepared was a coating liquid for forming the optical adjusting layers. The refractive index of the cured product obtained therefrom was measured according to JIS K 7105. The resultant value was used as the refractive index of the optical adjusting layer. Specifically, a bar coater was used to apply the coating liquid onto an untreated polyethylene terephthalate film (hereinafter referred to as the PET film), and the resultant workpiece was dried at 80° C. for 60 minutes. Next, the resultant workpiece was irradiated with ultraviolet rays having a light quantity of 0.6 J/cm$^2$ to cure the applied film. This operation was repeated two times to form a cured product in which two cured layers were laminated onto each other. Thereafter, the cured product was peeled from the PET film. An Abbe refractometer was used to enter a measuring light ray (sodium D ray) into the resultant cured product and measure the refractive index thereof at 25.0±1.0° C. four times. The average of the measured values was determined to be the refractive index nD25 of the optical adjusting layers.

<Thickness of Each Layer>

For measuring the thicknesses of the anti-blocking layer, the optical adjusting layer and the transparent conductive layer, an instant multi photometry system, "MCPD 2000" (trade name), manufactured by Otsuka Electronics Co., Ltd. was used to measure the waveform of each of respective interference spectra at five points of the film which were located at regular intervals in the width direction of the film. On the basis of the resultant waveforms, the average of the values of the thickness was calculated.

<Mode Diameter of Particles>

A flow-type particle image analyzer (manufactured by Sysmex Corporation, trade name "FPIA-3000S") was used to measure the mode diameter of the particles under predetermined conditions (sheath liquid: ethyl acetate, measurement mode: HPF measurement; and measurement method: total count). A used measuring sample was prepared by diluting the particles with ethyl acetate into 1.0% by weight, and then using an ultrasonic cleaning machine to disperse the particles evenly.

<Median Diameter of Inorganic Component>

A sample was diluted to a solid concentration of 1% with a diluent (propylene glycol monomethyl ether), and the particle size distribution was measured by a dynamic light scattering particle size distribution measurement apparatus (LB-500 manufactured by HORIBA, Ltd.) to determine the median diameter of the inorganic component.

<Measurement of Reflectance>

Figure 4A:
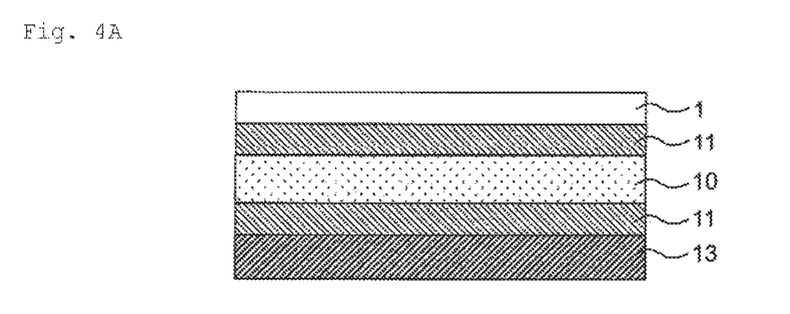
FIG. 4A is an illustrative view schematically showing a measuring procedure of a reflectance.
Figure 4B:
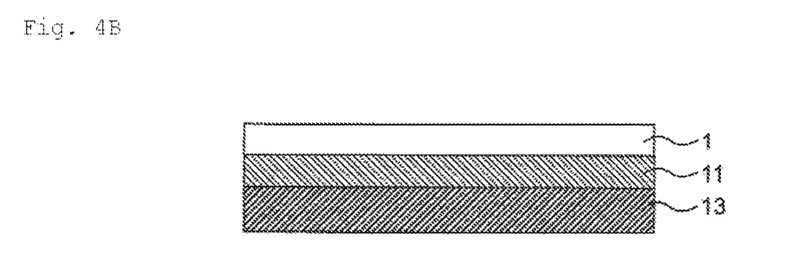
FIG. 4B is an illustrative view schematically showing a measuring procedure of a reflectance.

The reflectance in a wavelength range of 380 to 780 nm was measured at wavelength intervals of 5 nm with an incident angle of 2 degrees to the transparent conductive layer using an integrating sphere measurement mode in Spectrophotometer "U-4100" (trade name) manufactured by Hitachi High-Technologies Corporation, and the average of the measured reflectances was defined as a reflectance of the double-sided transparent conductive film. The measurement was performed while as shown in FIG. 4A, a black acrylic plate 13 was bonded to one surface of the double-sided transparent conductive film 10 (sample) on the transparent conductive layer 4b side with a pressure-sensitive adhesive 11 to form a light-shielding layer, and a base material film 1 in preparation of the transparent conductive film was bonded to the other surface of the double-sided transparent conductive film 10 with the pressure-sensitive adhesive 11, so that reflection of light from the back surface of the sample and incidence of light from the back surface side hardly occurred. In this way, a reflectance 1 was obtained. Further, a reflectance 2 was obtained by measuring the reflectance again while only the base material film 1 was bonded to the black acrylic plate 13 with the pressure-sensitive adhesive 11 as shown in FIG. 4B. A reflectance value was obtained by subtracting the reflectance 2 from the reflectance 1.

<Blocking Resistance>

A film having high smoothness (trade name "ZEONOR Film ZF-16" manufactured by Zeon Corporation) was press-bonded to the surface of the transparent conductive layer of the prepared double-sided transparent conductive film with a finger pressure, and the sticking condition was evaluated in accordance with the following criteria.

(Evaluation Criteria)
⊙: Sticking does not occur.
◯: Film temporarily sticks, but peels off with elapse of time.
×: Film persistently sticks, and does not peel off.

<Evaluation of Scattering of Reflected Light>

The prepared double-sided transparent conductive film was visually inspected using an optical microscope (magnification: 50) while white light was transmitted through the film, and whether or not scattering of reflected light occurred was determined in accordance with the following criteria.

(Evaluation Criteria)
⊙: Scattering of reflected light does not occur at all.
◯: Scattering of reflected light hardly occurs.
Δ: Scattering of reflected light occurs, but visibility is not influenced.
×: Influences of scattering of reflected light are strong enough to impair visibility.

TABLE 1

| | Anti-blocking layer | | | Optical adjusting layers 31a and 31b | | | Optical adjusting layers 32a and 32b | | |
|---|---|---|---|---|---|---|---|---|---|
| | Most-frequent particle size d [nm] | Flat portion thickness $T_A$ [nm] | $d - T_A$ | Refractive index | Thickness [nm] | Median diameter of inorganic component [nm] | Refractive index | Thickness [nm] | Median diameter of inorganic component [nm] |
| Example 1 | 1800 | 1000 | 800 | 1.62 | 85 | 40 | 1.46 | 30 | — |
| Example 2 | 1800 | 1000 | 800 | 1.74 | 40 | 40 | 1.5 | 50 | 20 |
| Example 3 | 1800 | 1000 | 800 | 1.74 | 40 | 25 | 1.5 | 50 | 20 |
| Example 4 | 1800 | 1500 | 300 | 1.74 | 40 | 40 | 1.5 | 50 | 20 |
| Example 5 | 1800 | 500 | 1300 | 1.74 | 40 | 40 | 1.5 | 50 | 20 |
| Example 6 | 1800 | 1000 | 800 | 1.74 | 120 | 40 | 1.5 | 5 | 20 |
| Example 7 | 1800 | 1000 | 800 | 1.74 | 30 | 40 | 1.5 | 60 | 20 |
| Example 8 | 1800 | 1000 | 800 | 1.74 | 45 | 40 | 1.5 | 200 | 20 |
| Example 9 | 1800 | 1000 | 800 | 1.74 | 45 | 40 | 1.5 | 20 | 20 |
| Comparative Example 1 | 1800 | 1700 | 100 | 1.62 | 85 | 40 | 1.46 | 30 | — |
| Comparative Example 2 | 1800 | 1000 | 800 | 1.74 | 20 | 40 | 1.5 | 25 | 20 |
| Comparative Example 3 | 1800 | 1000 | 800 | 1.74 | 210 | 40 | 1.5 | 45 | 20 |
| Comparative Example 4 | 1800 | 1000 | 800 | 1.62 | 85 | 40 | — | — | — |
| Comparative Example 5 | 1800 | 1000 | 800 | 1.62 | 115 | 40 | — | — | — |

| | Thickness of optical adjusting layer-laminate [nm] | Thickness of transparent conductive layer [nm] | Reflectance [%] | Blocking resistance | Scattering of reflected light |
|---|---|---|---|---|---|
| Example 1 | 115 | 20 | 0.52 | ◯ | ◯ |
| Example 2 | 90 | 20 | 0.28 | ◯ | ◯ |
| Example 3 | 90 | 20 | 0.28 | ◯ | ⊙ |
| Example 4 | 90 | 20 | 0.28 | ◯ | ⊙ |
| Example 5 | 90 | 20 | 0.28 | ⊙ | Δ |
| Example 6 | 125 | 20 | 0.50 | ◯ | Δ |
| Example 7 | 90 | 20 | 0.43 | ◯ | Δ |
| Example 8 | 245 | 20 | 0.61 | ◯ | Δ |
| Example 9 | 65 | 20 | 1.20 | ◯ | ⊙ |
| Comparative Example 1 | 115 | 20 | 0.52 | × | ⊙ |
| Comparative Example 2 | 45 | 20 | 2.85 | ◯ | Δ |
| Comparative Example 3 | 255 | 20 | 0.52 | ◯ | × |
| Comparative Example 4 | 85 | 20 | 2.40 | ◯ | ◯ |
| Comparative Example 5 | 115 | 20 | 1.40 | ◯ | Δ |

In the double-sided transparent conductive films of Examples 1 to 9, the reflectance was reduced, good blocking resistance was obtained, and scattering of reflected light was suppressed, so that a good external appearance was obtained, or at least there was no influence on visibility.

On the other hand, the double-sided transparent conductive film of Comparative Example 1 had a good reflectance and external appearance, but was poor in blocking resistance. This may be because the difference $d-T_A$ between the mode diameter d of particles and the thickness $T_A$ of the flat portion in the anti-blocking layer was excessively small, so that the protrusion portion was buried due to formation of the optical adjusting layer. The double-sided transparent conductive film of Comparative Example 2 had no problem in blocking resistance and external appearance, but had a large reflectance value because the thickness of the optical adjusting layer laminate was less than 60 nm, and thus control of reflection characteristics was insufficient. The double-sided transparent conductive film of Comparative Example 3 had a good reflectance and good blocking resistance, but was poor in external appearance. This may be because the thickness of the optical adjusting layer was excessively large, so that the coating solution markedly spread to the periphery of the protrusion portion, and thus an optical design on the periphery of the protrusion portion was collapsed to cause scattering of light. The double-sided transparent conductive films of Comparative Examples 4 and 5 had a high reflectance because only one optical adjusting layer was formed, and thus it was unable to control the reflection characteristics of the double-sided transparent conductive film.

In Examples 6 and 7, scattering of reflection light hardly occurred, but there were external appearance defects in the form of small-size projections, which were supposed to result from the inorganic component in the optical adjusting layer. These defects do not influence visibility, but it may be preferable that the median diameter of the inorganic component is made smaller than the thickness of the optical adjusting layer for avoiding these defects.

DESCRIPTION OF REFERENCE SIGNS

1 Base material film
2a, 2b Anti-blocking layer
3a, 3b Optical adjusting layer laminate
31a, 31b, 32a, 32b Optical adjusting layer
4a, 4b Transparent conductive layer
5 Particles
10 Double-sided transparent conductive film
21 Flat portion
22 Protrusion portion
O Pattern opening part
P Pattern-formed part
$T_A$ Thickness of anti-blocking layer
$T_o$ Thickness of optical adjusting layer laminate
X Double-sided pattern region
Y1, Y2 Single-sided pattern region

The invention claimed is:

1. A double-sided transparent conductive film comprising a base material film with an optical adjusting layer laminate and a transparent conductive layer formed in this order on each of both sides, the optical adjusting layer laminate including two or more optical adjusting layers, wherein
   the optical adjusting layers have different refractive indexes in each of the optical adjusting layer laminates,
   an anti-blocking layer containing particles is formed between the base material film and at least one of the optical adjusting layer laminates,
   the anti-blocking layer includes a flat portion, and a protrusion portion resulting from the particles,
   a value obtained by subtracting a value of a thickness of the flat portion of the anti-blocking layer from a value of a mode diameter of the particles is larger than a value of a thickness of the optical adjusting layer laminate, and
   the optical adjusting layer laminates each have a thickness of not less than 60 nm and not more than 250 nm.

2. The double-sided transparent conductive film according to claim 1, wherein the optical adjusting layer is a layer formed by wet coating.

3. The double-sided transparent conductive film according to claim 1, which has a reflectance of 1.2% or less.

4. The double-sided transparent conductive film according to claim 1, wherein the value obtained by subtracting the value of the thickness of the flat portion of the anti-blocking layer from the value of the mode diameter of the particles is not less than 200 nm and not more than 1200 nm.

5. The double-sided transparent conductive film according to claim 1, wherein at least one of the optical adjusting layers is formed of an organic-inorganic composite material containing an organic component and an inorganic component, and
   a value of a median diameter of the inorganic component is smaller than the value of the thickness of the optical adjusting layer.

6. The double-sided transparent conductive film according to claim 1, wherein the transparent conductive layer is patterned, and has: a pattern-formed part where the transparent conductive layer forms a pattern; and a pattern opening part where the transparent conductive layer does not exist.

7. The double-sided transparent conductive film according to claim 1, wherein the base material film contains a cycloolefin-based resin.

8. A double-sided transparent conductive film wound body comprising a lengthy body of the double-sided transparent conductive film according to claim 1 wound in a roll shape.

9. A touch panel comprising the double-sided transparent conductive film according to claim 1.

* * * * *